(12) United States Patent
Merlot, Jr. et al.

(10) Patent No.: US 7,210,726 B2
(45) Date of Patent: May 1, 2007

(54) COVER SYSTEM

(75) Inventors: Vincent J. Merlot, Jr., Pittsburgh, PA (US); Richard Mergenthaler, Pittsburgh, PA (US)

(73) Assignee: Merlot Tarp & Sidekit Company, Verona, PA (US)

( * ) Notice: Subject to any disclaimer, the term of this patent is extended or adjusted under 35 U.S.C. 154(b) by 123 days.

(21) Appl. No.: 11/011,715

(22) Filed: Dec. 14, 2004

(65) Prior Publication Data

US 2006/0125278 A1    Jun. 15, 2006

(51) Int. Cl.
*B60P 7/00*    (2006.01)

(52) U.S. Cl. .............................. 296/100.12; 296/100.11

(58) Field of Classification Search ........... 296/100.11, 296/100.12, 100.15, 100.16, 105, 100.18
See application file for complete search history.

(56) References Cited

U.S. PATENT DOCUMENTS

| | | | |
|---|---|---|---|
| 1,263,759 A | 4/1918 | Hanaway |
| 2,469,958 A | 5/1949 | Fowler |
| 2,797,696 A | 7/1957 | Fritsche |
| 2,828,756 A | 4/1958 | Worley |
| 2,950,727 A | 8/1960 | Dunn |
| 2,986,150 A | 5/1961 | Torian |
| 3,028,872 A | 4/1962 | Cresswell |
| 3,165,110 A | 1/1965 | Brooks |
| 3,361,144 A | 1/1968 | Folkes |
| 3,415,260 A | 12/1968 | Hall |
| 3,424,179 A | 1/1969 | Minot |
| 3,469,587 A | 9/1969 | Folkes |
| 3,534,511 A | 10/1970 | Cappella |
| 3,692,354 A | 9/1972 | Tuerk |
| 3,720,438 A | 3/1973 | Johnson et al. |
| 3,780,477 A | 12/1973 | Sprung |
| 3,875,623 A | 4/1975 | Johnston |
| 3,961,638 A | 6/1976 | Huddle |
| 3,979,782 A | 9/1976 | Lamb |
| 4,118,904 A | 10/1978 | Sprung |
| 4,137,687 A | 2/1979 | Sprung |
| RE30,044 E | 7/1979 | Huddle |

(Continued)

FOREIGN PATENT DOCUMENTS

CA    825855    10/1969

(Continued)

OTHER PUBLICATIONS

Conestoga 2000 Tarping System, Aero Industries, Inc., Brochure.

(Continued)

*Primary Examiner*—Joseph D. Pape
(74) *Attorney, Agent, or Firm*—Alicia M. Passerin, Esq.; Cohen & Grigsby, P.C.

(57) ABSTRACT

The invention comprises a retractable cover system comprising: a flexible cover. A plurality of supporting bows support the cover. A semi-rigid member having first and second ends is secured to the cover section. The semi-rigid member is capable of flexing laterally outward if the system is retracted. This outward action allows the cover or cover sections to consistently fold in the same way and prevents the cover or cover sections from getting caught in the load or in the cover system componentry. The invention also comprises a segmented tube secured to the bottom portion of the cover between the bows.

4 Claims, 7 Drawing Sheets

U.S. PATENT DOCUMENTS

| | | | |
|---|---|---|---|
| 4,189,178 A | 2/1980 | Cramaro | |
| 4,328,853 A | 5/1982 | Gall et al. | |
| 4,342,480 A * | 8/1982 | Ross, Jr. | 296/100.12 |
| 4,583,331 A | 4/1986 | Hunt | |
| 4,583,777 A | 4/1986 | Myburgh | |
| 4,657,062 A | 4/1987 | Tuerk | |
| 4,711,484 A | 12/1987 | Tuerk | |
| 4,740,029 A | 4/1988 | Tuerk | |
| 4,747,441 A | 5/1988 | Apolzer et al. | |
| 4,773,191 A | 9/1988 | Slack | |
| 4,800,947 A | 1/1989 | Loomis | |
| 4,801,171 A | 1/1989 | Weaver | |
| 4,841,688 A | 6/1989 | Rinaldi | |
| 4,854,630 A | 8/1989 | Biancale | |
| 4,902,064 A | 2/1990 | Tuerk et al. | |
| 4,922,988 A | 5/1990 | Loomis | |
| 5,026,109 A | 6/1991 | Merlot, Jr. | |
| 5,080,422 A | 1/1992 | DeMonte et al. | |
| 5,152,575 A | 10/1992 | DeMonte et al. | |
| 5,924,759 A | 7/1999 | DeMonte et al. | |

FOREIGN PATENT DOCUMENTS

| | | |
|---|---|---|
| CA | 867009 | 3/1971 |
| CA | 2013531 | 3/1997 |
| CA | 2058001 | 3/1997 |
| DE | 2257572 | 11/1972 |
| DE | 2308436 | 2/1973 |
| DE | 25 19 365 | 11/1976 |

OTHER PUBLICATIONS

Aquadome Mark II by Fold-Way Covers, Ltd, circa 1960s/1970s.

Transcript of Deposition of Robert P. Tuerk, dated Jul. 7, 2000, pp. 1-17, filed in the U.S. District Court, Western District of Pennsylvania, *Sundance, Inc.* v. *Aero Industries, Inc.*, Civil Action No. 97-0627.

Transcript of Deposition of James R. Tuerk, dated Oct. 21, 1997, pp. 1-44, filed in the U.S. District Court, Western District of Pennsylvania, *Sundance, Inc.* v. *Aero Industries, Inc.*, Civil Action No. 97-0627.

Affidavit of Robert P. Tuerk for Defendant Aero Industries, Inc. filed May 5, 1998, filed in the U.S. District Court, Western District of Pennsylvania, *Sundance, Inc.* v. *Aero Industries, Inc.*, Civil Action No. 97-0627.

Affidavit of James R. Tuerk for Defendant Aero Industries, Inc. filed May 28, 1998, filed in the U.S. District Court, Western District of Pennsylvania, *Sundance, Inc.* v. *Aero Industries, Inc.*, Civil Action No. 97-0627.

Magistrate Judge's Report and Recommendation, Sundance, U.S. District Court, Western District of Pennsylvania, *Sundance, Inc.* v. *Aero Industries, Inc.*, Civil Action No. 97-0627.

Quick Draw Tarpaulin Systems by DeMonte Fab. Ltd. Brochure.

Quick Draw Tarpaulin Systems Drive with Pride Brochure.

* cited by examiner

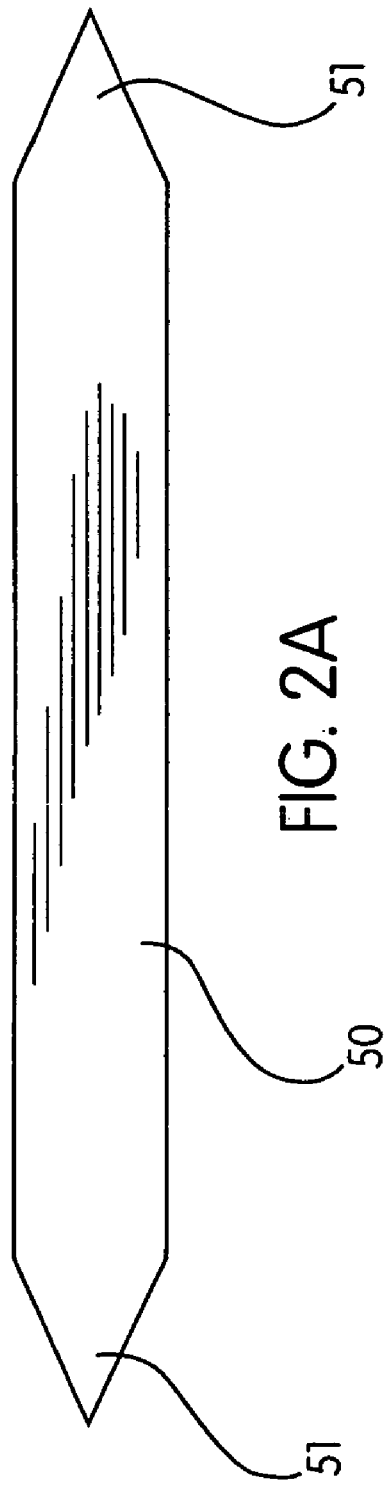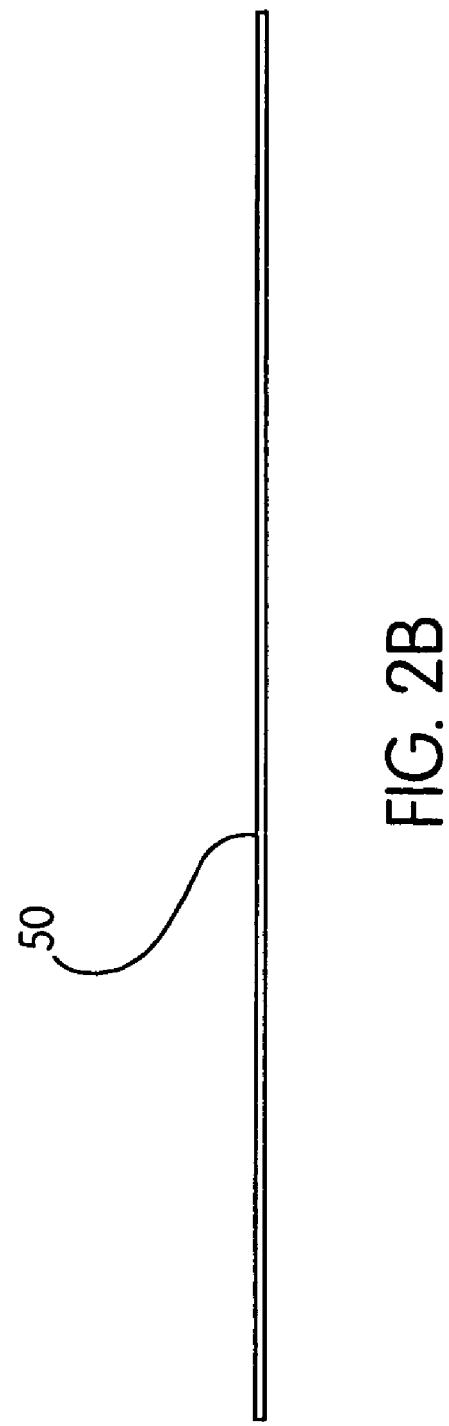

COVER SYSTEM

FIELD OF THE INVENTION

This invention relates to retractable tarpaulins and cover systems, and more specifically, to retractable tarpaulins and cover systems used with trucks and trailers.

BACKGROUND OF THE INVENTION

Retractable covering systems for trucks and trailers are known. Such systems have the advantage of covering a load that is perishable, hazardous, or apt to fall from the truck or trailer thereby causing a risk to other motorists. Retractable covering systems also protect loads from the elements. These systems allow the operator to retract the cover from over the load or extend the cover over the load based on the operator's need at the time, e.g., uncovered goods for unloading or protected transport of goods.

U.S. Pat. Nos. 5,026,109 and 5,152,175 disclose retractable covering systems for trucks and/or truck trailers. Whether on trucks, truck trailers, or freestanding, such systems typically comprise one unitary cover or a series of segmented cover sections. In the case of a unitary cover, such a cover is supported by a series of arches or bows. The cover is additionally secured in some way to the bows. The cover, along with the bows, are able to be retracted and extended thereby allowing for the selected covering and uncovering of the target space.

In the case of segmented cover systems as disclosed in U.S. Pat. No. 5,026,109, such systems comprise a series of cover segments that are typically detachably connected between the bows of the system. Such systems can be retracted and extended in the same way as described above.

A notable drawback of the prior art systems occurs when such systems are retracted. That is, the cover material can get caught in the cover system componentry or in the load upon retraction because the cover system does not fold up in a consistent manner. For such systems to work properly, the cover or cover sections must fold in a consistent fashion and in such a way that the cover material does not interfere with the covered goods, or the mechanics of the covering system itself. In many instances, the material between the supporting bows folds inward upon retracting and either catches on the goods to be covered or becomes caught in the componentry of the retractable system. Also, when a cover or cover sections do not fold up in a consistent fashion or bunch up between supporting sections, the retractability of the cover system may be compromised. In many instances, it becomes necessary to extend and retract the system several times before the operator can get the system to retract fully. This results in costly downtime, and in some instances, damage to the cover system due to the cover system being caught in the mechanical components of the system, the load, etc.

Another drawback in such systems typically comprise a continuous cable fed through the bottom of the cover on each side of the trailer and for the length of the trailer. In such systems, the cable is necessary to keep the bottom of the cover taut, which provides a seal to keep out moisture and wind. The continuous cable must be removed each time the cover needs to be removed, and re-fed through the cover once the cover is ready to be placed on the trailer. This, too, results in costly downtime, and requires extensive labor.

Thus, there exists a need to provide a device that will provide a consistent folding pattern for a cover or the cover sections such that when such a covering system is retracted, the cover or cover sections will not interfere with the items to be covered or with the mechanics and componentry of the covering system itself. There is also a need to provide a device that eliminates the continuous cable fed through the bottom of the cover to keep the system taut.

SUMMARY AND OBJECT OF THE INVENTION

The invention comprises a retractable cover system comprising: a flexible cover. A plurality of supporting bows support the cover. A semi-rigid member having first and second ends is secured to the cover section. The semi-rigid member is capable of flexing laterally outward if the system is retracted. This outward action allows the cover or cover sections to consistently fold in the same way and prevents the cover or cover sections from getting caught in the load or in the cover system componentry without the use of upbows. The invention also provides a segmented tube means in the bottom portion of the cover instead of a continuous cable.

It is thus an object of the invention to provide a covering system capable of freely retracting and extending without interference from the covering system or the item to be covered.

It is a further object of the invention to reduce costly down time caused by difficult to retract cover systems.

BRIEF DESCRIPTION OF THE DRAWINGS

FIGS. 2A and 2B are a side elevational view and a top view respectively of the semi-rigid member.

DETAILED DESCRIPTION OF THE PREFERRED EMBODIMENT

Figure 1:
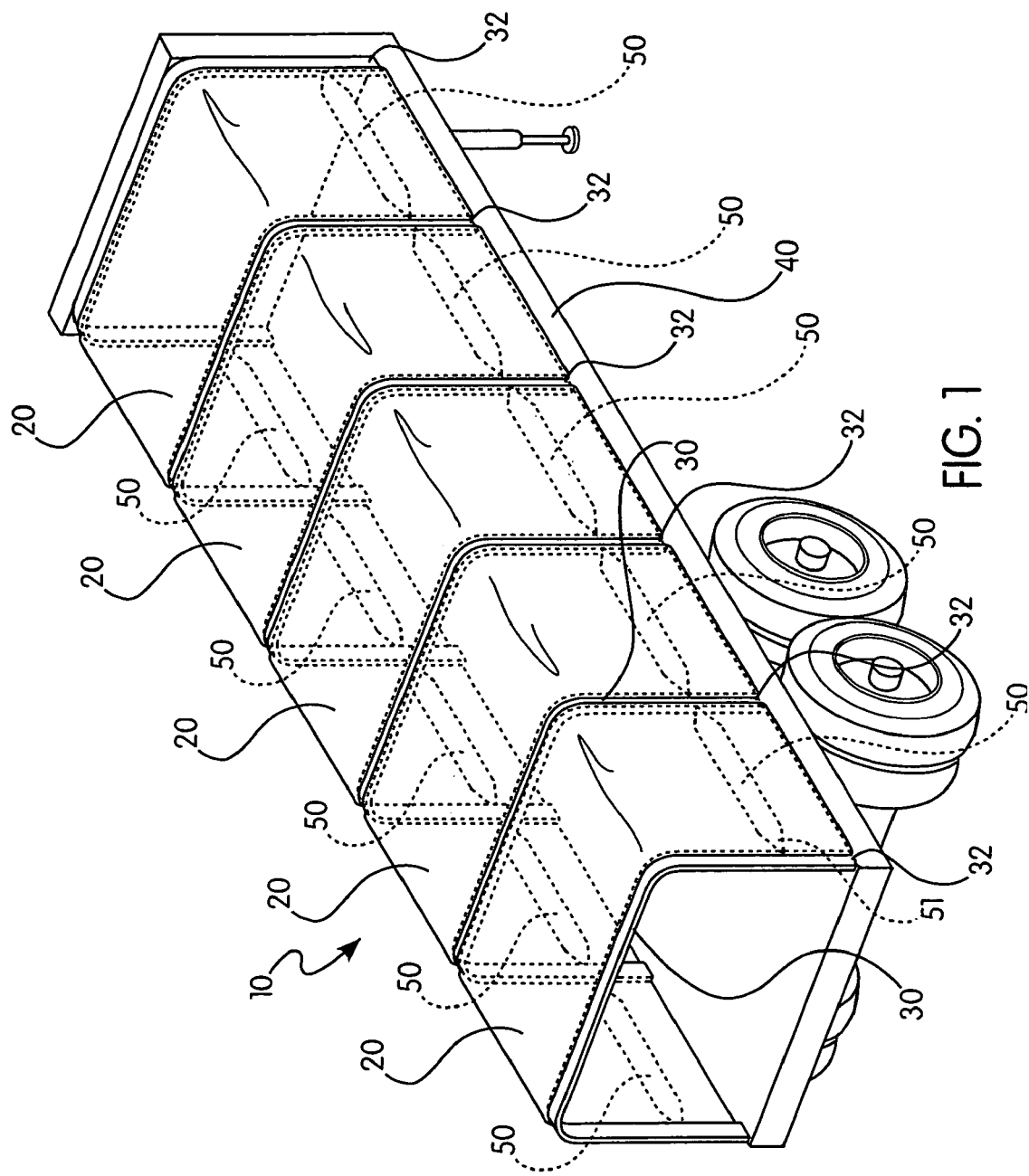
FIG. 1 is a perspective view of an embodiment of the invention wherein the cover is comprised of separate cover sections and wherein the system is mounted on a flat-bed trailer.

FIG. 1 shows a segmented retractable cover system 10 of the present invention utilizing a plurality of cover sections 20 interspaced between supporting bows 30. In this particular embodiment, the system 10 is mounted and used on a flat-bed type truck trailer 40. The trailer 40 supports the supporting bows 30 at the ends 32 of the supporting bows. However, those skilled in the art will appreciate that any size or type of trailer may be used to support the system, and that the system could also be mounted to the cargo portion of a vehicle rather than a trailer. The cover sections 20 are of a length sufficient to span the trailer 40 and provide a cover. In this embodiment, the length of the cover sections 20 is roughly equal to the length of the supporting bow 30 transversing the trailer 40. If the supporting bow 30 is an assembly of components, the length of the cover section 20 is roughly equal to the length of the bow assembly that transverses the trailer 40.

The supporting bows 30 support and connect the series of cover sections 20 over the trailer 40. The number of supporting bows and cover sections can easily be adjusted depending upon the length of the truck trailer to be covered. The cover sections 20 of the segmented cover system embodiment can be detachably connected to the bows 30 in a number of ways. U.S. Pat. No. 5,026,109 describes one of the ways the cover sections could be detachably connected. The edges of the cover section 20 have beaded edges that are thicker than the center of the cover. The edges can slidably engage with grooves on the bows 30. The grooves are capable of receiving and holding the cover sections 20. The skilled artisan will appreciate that there are a variety of mechanisms to detachably connect cover sections 20 to bows 30, and if grooves are used, that the grooves can be in a variety of sizes and arrangements.

Secured to the cover sections is a semi-rigid member 50. The members 50 can be made of a polymer material and are preferably a plastic strip of material. In another embodiment, a member could be semi-rigid plastic tubing or semi-rigid rubber tubing. The preferred embodiment of members 50 are shown in phantom in FIG. 1. This is because it is preferable to secure the member 50 by way of providing a sewn pocket on the cover section 20 in which the member 50 fits. The members 50 extend roughly the width of the cover sections 20 and in the same direction as the trailer 40. The ends 51 of the members are preferably tapered. FIGS. 2A and 2B show alternate views of an embodiment of the semi-rigid member having tapered ends. Preferably, a portion of the ends extend over an outward facing surface of each adjacent supporting bow as described.

Figure 3:
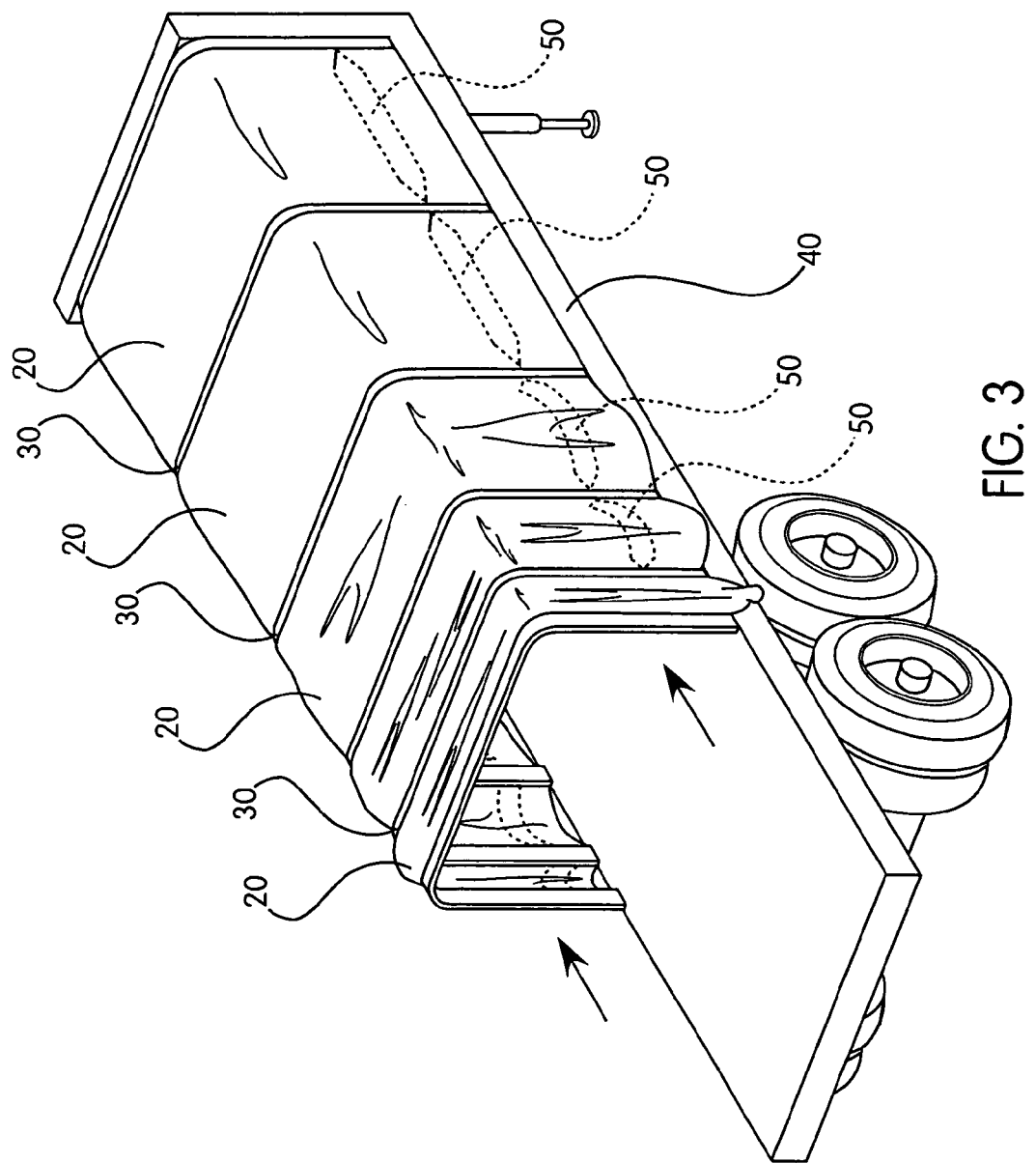
FIG. 3 is a perspective view of the system of FIG. 1 being retracted.
Figure 4:
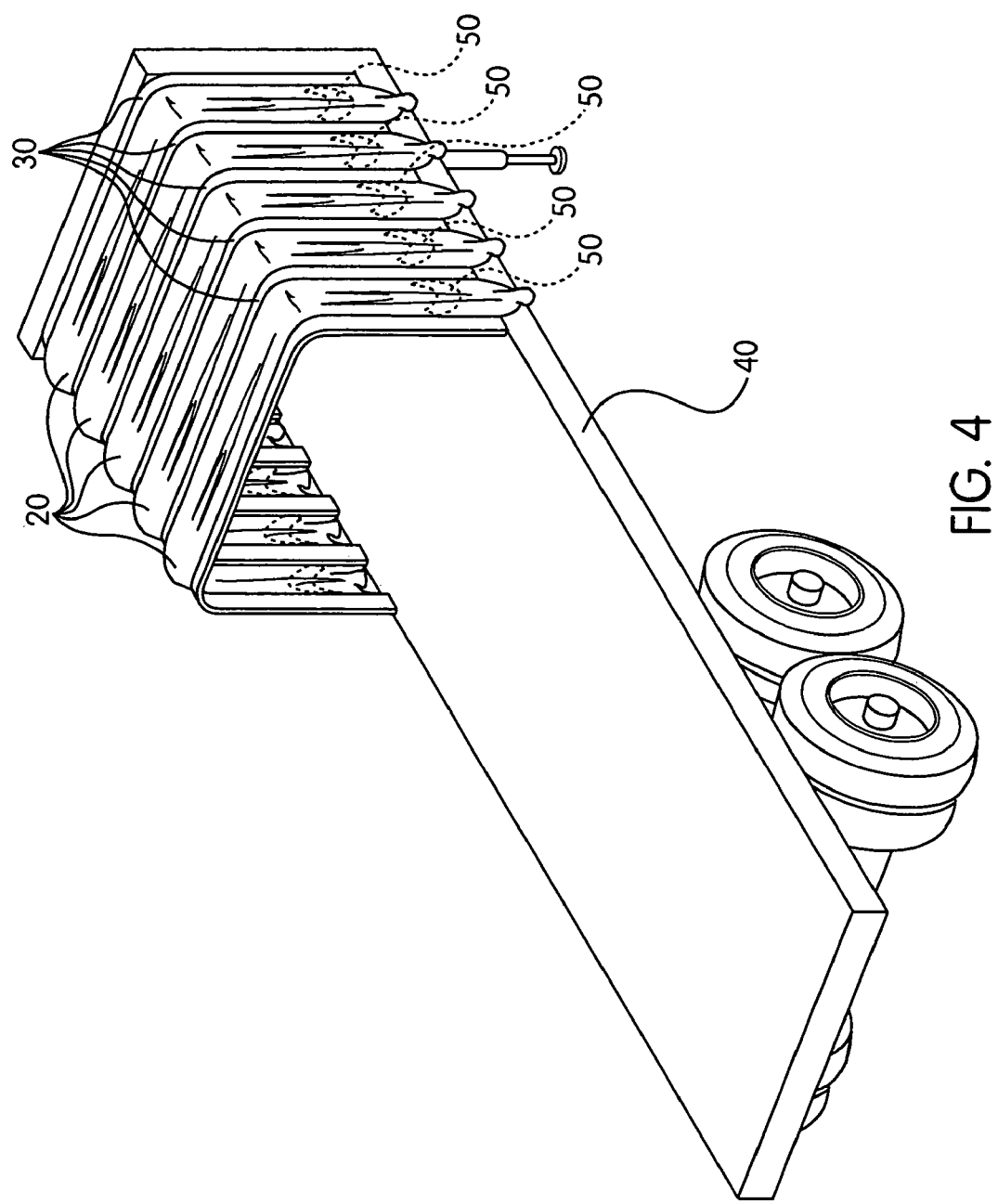
FIG. 4 is a perspective view of the system of FIG. 1 being further retracted.

FIGS. 3 and 4 show the system in separate stages of the traction in the direction of the arrows. The semi-rigid member 50 bows in an outward direction upon retraction of the system.

Figure 5:
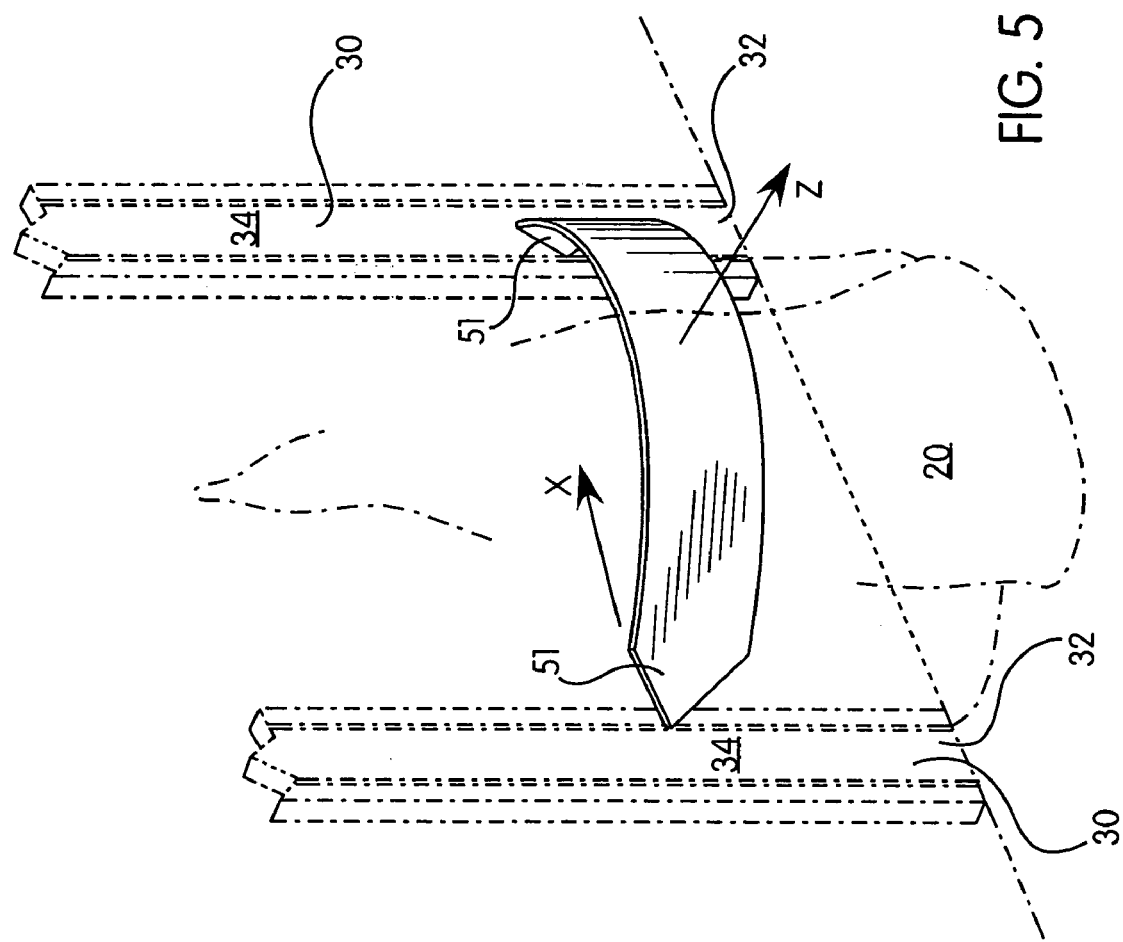
FIG. 5 is a schematic representation of the semi-rigid member moving in an outward direction caused by the retraction of the cover system.

As schematically represented in FIG. 5, the outward bowing action is caused by the placement of the ends of the members 51 over the outward facing side 34 of the support bows 30 and by the ends 51 coming into contact, either directly or indirectly, with the outward facing side 34 of the support bow 30. The inventors have found that the outward facing surface 34 of the supporting bows 30 prevents member 50 from bowing inward, but forces the member 50 to bow in the outward direction as represented by arrow Z when one bow approaches the other by moving in direction X. This bowing action in turn carries the cover section 20 in an outward direction, thereby facilitating consistent folding of the lower sections upon (or in the case of a unitary cover, the cover) retraction.

In this way, the system provides a mechanism that forces the cover which may comprise cover sections, in an outward direction upon retraction. Again, FIGS. 3 and 4 show an embodiment of the system in operation. When the system is retracted in the direction of the arrows the members 50 and corresponding cover sections 20 bow in the outward direction. This allows for the cover to fold in a consistent manner upon retraction of the system. In this way, the system provides a mechanism that prevents the cover from folding inward and becoming lodged in the componentry of the cover system. The system also prevents the cover from bunching up between the supporting bows 30 or folding in an irregular manner so as to interfere with the retraction system.

Any conventional driving means can be used to retract and extend the system. The preferred driving means comprises wheels affixed to the ends of the supporting bows or in close proximity thereto. The wheels may rest in tracks or similar guide means that are affixed to the trailer. An example of such a drive means can be found described in U.S. Pat. No. 5,152,175. Those skilled in the art will appreciate, however, that the system could comprise an electrical motor in combination with a pulley and endless cable arrangement, such as one of the embodiments of a drive assembly described in U.S. Pat. No. 5,026,109. Also, the bows need not have wheels at all with the ends of the bows contacting the surface of the trailer or track when the system extends and retracts.

Figure 6:
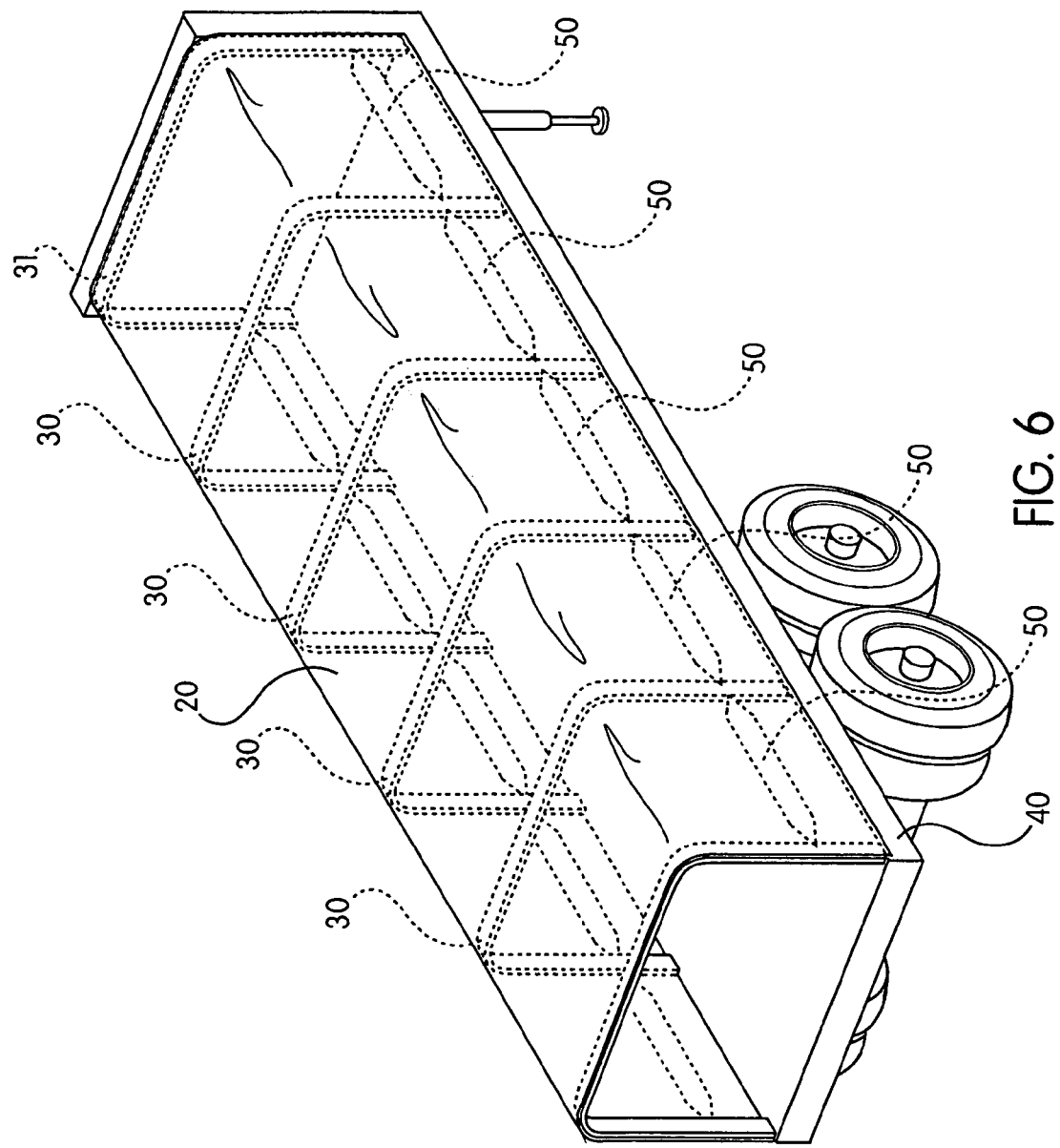
FIG. 6 is an embodiment of the invention wherein the cover is unitary.

In another embodiment, the cover system 10 applies to nonsegmented cover systems wherein the covering comprises a unitary cover that is connected the supporting bows 30. A particular embodiment is shown FIG. 6 wherein the unitary cover 20 is placed over and connected to the bows 30. In this embodiment, the semi-rigid members 50 extend roughly the width of the space between the bows and in the same direction as the trailer. Similar to the embodiment disclosed above, the ends 51 of the members 50 are preferably tapered. And preferably, a portion of the ends 51 extend over an outward facing surface 34 of each adjacent supporting bow 30.

Figure 7:
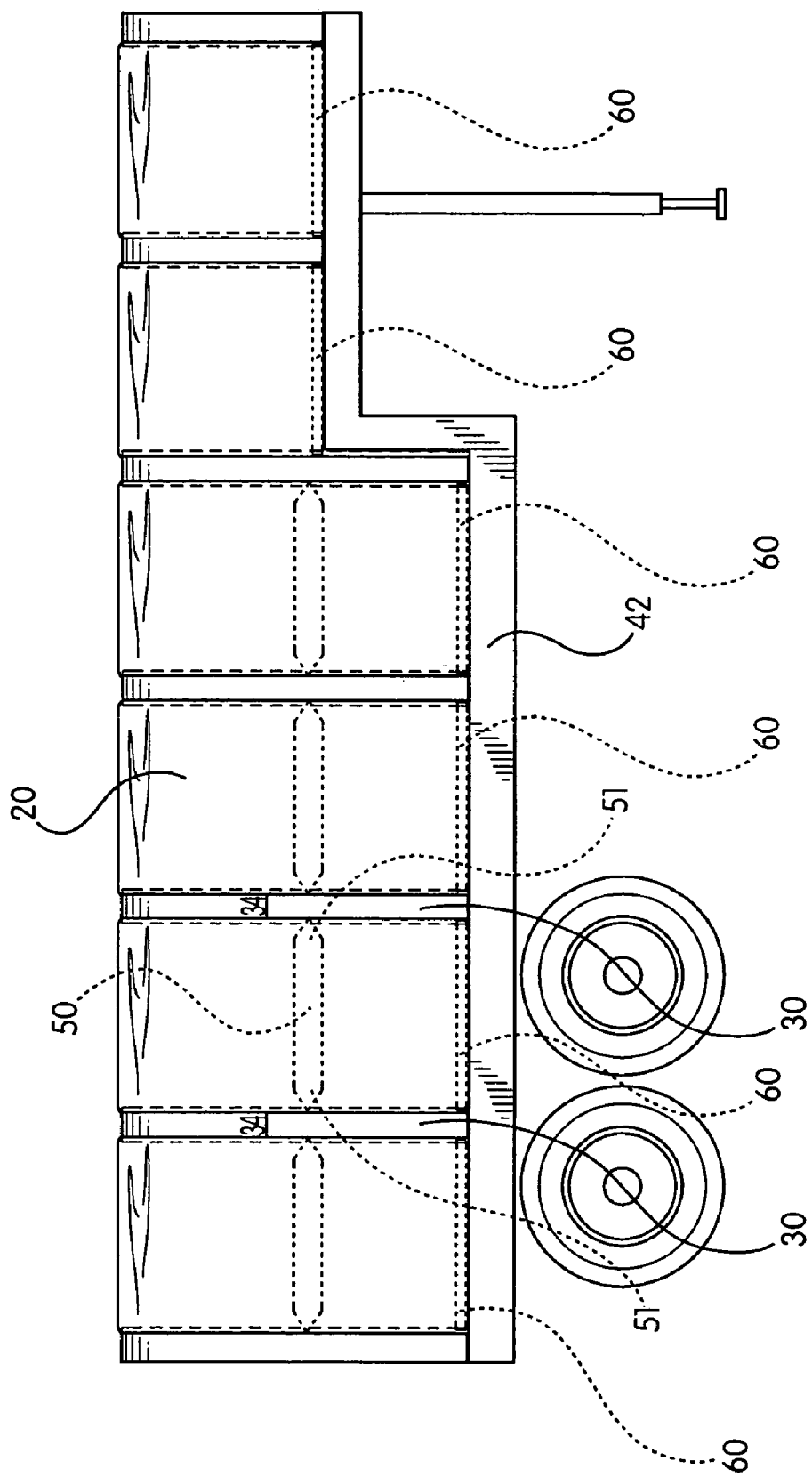
FIG. 7 is an embodiment of the invention on a drop deck trailer have a segmented tube means in each cover section.

The claimed system is particularly useful on drop-deck style trailers as shown in FIG. 7. On systems used with drop-deck trailers 42, the amount of material comprising the cover, or cover sections, on the lower part of the drop deck is greater than the cover section material used for the cover 20, or cover sections 20, on the upper portion of the drop-deck trailer. As such, the weight of the cover 20 or cover sections 20 on the lower portion of the drop-deck causes the lower portion of the cover 20 to fold inward, thereby increasing the risk that that the cover 20 can get caught in the componentry of the cover system. Therefore, it is preferable in this embodiment to place semi-rigid members 50 in the cover 20 or cover sections 20 to facilitate the bowing out of the cover sections 20 or cover 20 upon retraction. It is preferable that the semi-rigid members be secured to the cover, or cover sections, at a height substantially equal with the upper deck of the drop deck trailer.

FIG. 7 also shows another embodiment of the invention, which improves upon cover systems having continuous cables fed through the bottom of the cover on each side of the trailer. The continuous cable of the prior art is necessary to keep the cover and sections therein taut in order to provide a seal from the elements. Now the present invention provides those advantages without having a continuous cable. The present invention comprises a segmented tube means, which preferably comprises a segment of tubing made of sythetic rubber, plastic, or other polymer material, 60 secured to each portion of the cover between supporting bows 30. The segment is preferably secured to the cover by being fed through a sewn loop or pocket in the bottom portion of each cover section. In the segmented cover system embodiment, each cover section 20 comprises a respective segment. The segment is preferably made of a rubber or a stretchable polymer that is flexible, but that when extended, provides semi-rigid support to the bottom of the cover. When the system is in the extended position, the segmented means supports the bottom of the cover preventing flaccidity and providing a seal with the trailer. In this way the invention provides the necessary tautness and seal to the bottom portion of the cover preventing the entrance of wind and moisture into the trailer.

While the foregoing has been set forth in considerable detail, it is to be understood that the drawings and detailed embodiments are presented for elucidation and not limitation. Design variations, especially in matters of shape, size and arrangements of parts maybe made but are within the principles of the invention. Those skilled in the art will realize that such changes or modifications of the invention or combinations of elements, variations, equivalents or improvements therein are still within the scope of the invention as defined in the appended claims.

We claim:

1. A retractable cover system comprising:
   a. a flexible cover, having a bottom portion;
   b. a plurality of supporting bows supporting and connected to said cover; and
   c. a segmented tube means for tensioning and sealing the bottom portion of the cover, the segmented tube means secured to the bottom portion and between each of the supporting bows and attached to said cover between said bows.

2. The retractable cover system of claim 1 further comprising a drive means to retract and extend the cover system.

3. The retractable cover system of claim 2 wherein said supporting bows further comprise ends and drive means comprises wheels attached to the ends of the supporting bows, said wheels engaged in a track.

4. The retractable cover system of claim 1, wherein said cover further comprises a plurality of cover sections spaced between and detachably connected to said supporting bows and wherein said bottom portion comprises a bottom portion of each of said cover sections.

* * * * *

UNITED STATES PATENT AND TRADEMARK OFFICE
CERTIFICATE OF CORRECTION

PATENT NO. : 7,210,726 B2 Page 1 of 1
APPLICATION NO. : 11/011715
DATED : May 1, 2007
INVENTOR(S) : Vincent J. Merlot, Jr. and Richard Mergenthaler It is certified that error appears in the above-identified patent and that said Letters Patent is hereby corrected as shown below:

Column 4, line 13, "connected the" should read --connected to the--

Column 4, line 49, "sythetic" should read --synthetic--

Signed and Sealed this

Eleventh Day of December, 2007

JON W. DUDAS
*Director of the United States Patent and Trademark Office*